Patented Jan. 13, 1953

2,625,520

UNITED STATES PATENT OFFICE 2,625,520

OXYGEN AND PEROXIDE TREATMENT OF ESTERS OF INORGANIC SILICON OXY ACIDS

John B. Rust, East Hanover, N. J., and Charles A. MacKenzie, New Orleans, La., assignors, by direct and mesne assignments, of one-half to Montclair Research Corporation, a corporation of New Jersey, and one-half to Ellis-Foster Company, a corporation of New Jersey No Drawing. Application February 25, 1948, Serial No. 10,944

28 Claims. (Cl. 260—2)

This invention relates to the production of polymeric organic silicon derivatives and more particularly to the methods of producing such derivatives from esters of silicon acids, the products resulting from such methods, and compositions, solutions, and coatings containing such products.

Among the objects of the present invention is the production of polymeric organic silicon derivatives by relatively simple methods.

Other objects include the utilization of such derivatives in the production of compositions, solutions, coatings, etc.

Still further objects include the production of insoluble, infusible polymeric organic silicon derivatives from soluble organic silicon derivatives.

Other and further objects and advantages of the present invention will appear from the more detailed description set forth below, it being understood that this more detailed description is given by way of illustration and explanation only, and not by way of limitation, since various changes therein may be made by those skilled in the are without departing from the scope and spirit of the present invention.

In accordance with the present invention, saturated esters of silicon acids particularly silicon-oxy acids are converted into polymeric compounds or insoluble, infusible silicon resins by the action of peroxides. A variety of saturated esters of silicon acids may be treated in accordance with the present methods for the production of the stated types of derivatives. The general formulation of the esters treated in accordance with the present invention may be represented by the following:

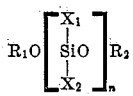

where $R_1$ and $R_2$ are saturated organic radicals and their derivatives including particularly saturated groups such as the alkyl, haloalkyl, and aryl radicals, and $X_1$ and $X_2$ may be saturated organic radicals as set forth above or hydrogen or the halogens, particularly chlorine or bromine, and $n$ is any positive integer. Where $n$ is 1, the pure esters per se are referred to, whereas when $n$ is higher than 1, siloxanes and polymeric derivatives are included.

More particularly saturated esters of the inorganic silicon acids may be treated in accordance with the present invention including such saturated esters of orthosilicic acid, polysilicic acids, the inorganic-substituted derivatives of such acids including silicoformic acid, chlorosilicoformic acid, etc. A general formulation for the esters of the inorganic silicon acids may be represented by the following:

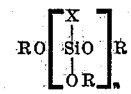

where R is a saturated organic radical or its derivative including for example, saturated radicals such as alkyl, haloalkyl, and aryl radicals, X is a saturated haloalkoxy, alkoxy radical, or hydrogen, and $n$ is any positive integer.

As exemplary of the saturated esters of orthosilicic acid, the following formula is representative:

$$\begin{array}{c} \text{OR} \\ | \\ \text{RO}-\text{Si}-\text{OR} \\ | \\ \text{OR} \end{array}$$

where R has the values set forth above.

The saturated esters of the polysilicic acid may be represented by the formula:

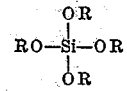

where R and $n$ have the values set forth above.

The saturated esters of silicoformic acid may be represented by the following:

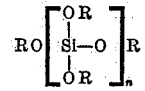

where R and $n$ have the values set forth above.

The saturated esters of chlorosilicoformic acid may be represented by the formulation:

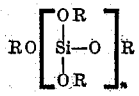

where R and $n$ have the values set forth above.

Any of these esters may be treated in accordance with the present invention including the saturated esters of orthosilicic acid, di-silicic acid, other polysilicic acids, silicoformic acid, chlorosilicoformic acid, alkoxy silicons, alkoxy alkyl silicons, alkoxy aryl silicons, and alkoxy cyclicalkyl silicons, but where saturated esters of the inorganic silicon acids are referred to they exclude the compounds where there is a hydrocarbon radical attached directly to silicon. Any of the esters treated may contain the same or different saturated groups in the same molecule, that is, R, R$_1$ and R$_2$ as given in the formulations set forth above may be the same or different saturated groups selected from those described above and further exemplified below so that mixed esters where different ester forming groups are present in the same molecule may be employed. Or mixtures of different esters may be utilized, as for example, where two saturated esters of silicon acids are mixed and employed for treatment in the present invention.

In any of the above formulations, the organic groups R, R$_1$ and R$_2$, or what may be called the ester forming groups may be selected from alkyl, aryl, alkaryl, aralkyl, cycloalkyl, and similar groups. Such substituent groups may be specifically the following: methyl, ethyl, propyl, isopropyl, butyl, isobutyl, amyl and the various isomeric amyl groups, hexyl, heptyl, octyl, nonyl, decyl, dodecyl, and higher alkyl groups, phenyl, tolyl, dimethyl phenyl, xenyl, and the halogen and other substituted radicals just set forth including for example, chlorphenyl, etc., also exemplary of the cycloalkyl groups, cyclohexyl, etc. For example, specific esters include ethyl orthosilicate, propyl orthosilicate, butyl orthosilicate, amyl orthosilicate, phenyl orthosilicate, methyl butyl orthosilicate, ethyl propyl orthosilicate, benzyl ethyl orthosilicate, tris-beta chlorethoxy silane, hexamethoxy disiloxane, tetra-kis (beta chloro-propoxy) silane, etc.

The peroxides employed may be either organic or inorganic and may be gaseous, liquid, or solid. These peroxides may be illustrated by the organic peroxides including such peroxides as benzoyl peroxide, tertiary butyl hydroperoxide, acetyl peroxide, cyclohexyl hydroperoxide, lauroyl peroxide, etc. Driers such as cobalt naphthenate, lead naphthenate, magnanese naphthenate, and the like, may also be employed to secure more rapid hardening of films and other compositions. Peroxides, perhydrols, and persalts particularly inorganic or metallic, may be used. Such metallic oxides as vanadium pentoxide, aluminum oxide, and the like may be employed. Examples will be given below employing zinc peroxide, sodium perborate, ammonium perborate, etc.

The temperature at which the reaction is carried out should be sufficient to yield a satisfactory speed of reaction and the desired effect and for these purposes elevated temperatures are preferred, as for example, temperatures above 100° C. up to the boiling point of the ester undergoing treatment and even higher temperatures may be employed if pressure is utilized. A preferred range of temperatures is that from 100° to 200° C. The reaction may be carried out in stages in which successively different temperatures are employed, as for example, higher temperatures in a first stage of reaction followed by lower temperatures in a later stage, or vice versa; and such stages of treatment may be employed where the combination of air and of peroxide treatments are utilized. Thus the ester may first be subjected to a treatment with air followed by peroxide treatment, or both air and peroxide treatments may be utilized simultaneously.

Where an air treatment step is used, it may be carried out by blowing air through the organo silicon derivative undergoing treatment while the latter is in liquid condition, as when the derivative is liquid at the temperatures of treatment, or it may be carried out by using the ester or mixed esters or mixtures of esters in solution in solvents desirably solvents which are inert to the oxygen treatment.

While varying amounts of peroxides may be employed, catalytic amounts of the peroxide are all that are necessary, as for example, from 1 to 5% of organic peroxides. Where a treatment with air is employed as a separate step from treatment with peroxide, the treatment with air or oxygen may be carried out until a substantial thickening or increase in viscosity of the ester is obtained before utilization of the peroxide treatment. Where mixtures of esters are employed, as for example, a mixture of an alkyl orthosilicate such as ethyl orthosilicate with an aryl orthosilicate such as phenyl orthosilicate, the individual esters may be present in varying proportions, as for example, where the alkyl ester is the major portion of the ester mixture or compositions may be used where the aryl ester is the major portion of the mixture undergoing treatment. The character and amount of peroxide employed, as well as the temperature of treatment, may be varied with particular esters or mixed esters, or mixtures of different esters, to vary the types of products which are obtained.

Variations in the methods of carrying out the treatment may be illustrated by the following. As noted above, the treatment with peroxide may be carried out in the presence of oxygen or air or a treatment with oxygen or air may proceed or follow the treatment with peroxide. For example, the organo silicon derivative may be heated at temperatures of from say 100° to 200° C. in the presence of a stream of air preferably dried air, to increase the viscosity somewhat, followed by continued heating at for example, 100° to 150° C. in the presence of the peroxide, such as the organic peroxide, to secure the desired cured resin. Or the organic silicon derivative may be treated with a current of dried air at say 100° to 150° C. in the presence of the organic peroxide or other peroxide. The treated product may be subjected to a further baking operation and any combination of such treatment steps as set forth above may be employed. Such heat treatment or baking operation may be applied as a continuation of the oxidation treatment either at the same or at a different temperature, and the product may be in any desired form at the time of such treatment, for example, the peroxide treatment may be applied to the derivative while the latter is present as a film or coating on an article and the heating continued of such film or coating. The heat treatment may be applied in the presence of peroxide while the saturated silicon ester is present in solution in organic solvents or while in suspension, or the silicon esters may be treated in the absence of any solvent or other suspending medium.

The products of the invention are generally speaking hard, tough resins, which may be in the form of baked coatings, laminated products, molding, and the like. The principal objective is to enable such products to be produced at substantially lower temperatures and in shorter baking periods than polymeric derivatives have heretofore been produced.

While aerated esters have been particularly emphasized above, other types of organo silicon derivatives may be treated in accordance with the present invention, for example, hydrolyzed silicones may be cured by means of peroxides. Thus hydrolyzed partially polymerized silicones such as the products available on the market under such names as Dow Corning resin solution No.

2052 may be treated by the methods set forth herein, i. e., such material either per se or in solution in for example, toluene, may be cured as in the form of a film, the curing being accelerated by peroxides such as benzoyl peroxide, particularly in combination with driers such as lead naphthenate. Or mixtures of such hydrolyzed silicones with any of the esters of silicic acids may be treated as set forth herein.

The following examples will serve to illustrate the invention, without limitation thereon, parts being by weight unless otherwise indicated.

*Example 1.*—Ethyl silicate $(C_2H_5)_4SiO_4$ was heated at 160° C. while dry air was passed through it for 5 hours. The ethyl silicate became very viscous and was thinned with xylol to form a solution containing 75% solids. A film baked for 2 hours at 150° C. was hard and tough. It cracked, however, on cooling.

A second film, to which 2% benzoyl peroxide was added, was baked at 150° C. for ½ hour. The film was clear, hard, and tough. Continued heating of the film for 2 hours caused no cracking after cooling.

*Example 2.*—Ethyl triethoxy siliconate $$C_2H_5Si(OC_2H_5)_3$$

was heated at 135° to 140° C. for 6 hours, and at 150° to 175° C. for 6 hours while dried air was passed through. A viscous syrup was secured which was dissolved in xylol to form a clear solution. A film of the aerated siliconate was baked at 150° C. for 1 hour. The film was rubbery, it cracked and peeled from the glass. A film of the above xylol solution containing 2% benzoyl peroxide was also baked at 150° C. for 1 hour. The film was brittle, hard, and peeled from the glass.

*Example 3.*—Dibutyl diethoxy siliconate $$(C_4H_9)_2Si(OC_2H_5)_2$$

was heated at 160° C. and for 10 hours at 180° C. while air (dry) was passed through. A pale colored syrup was secured which was dissolved in toluol to form a solution containing 65% solids. A film baked at 100° C. for 16 hours was tacky. Further baking at 150° to 160° C. for 5 hours gave a film which was rubbery and non-tacky. The film peeled and cracked from the glass.

A film containing 2% benzoyl peroxide was baked for 16 hours at 100° C. and was soft but tack-free. Further baking at 150° to 160° C. for 5 hours gave a film which was rubbery and hard. The film peeled and cracked from the glass.

*Example 4.*—Tetra phenyl silicate $(C_6H_5)_4SiO_4$ was heated at 170° to 180° C. for 8 hours while dry air was passed through. A pale colored syrup was secured which was dissolved in xylol to form a clear solution containing 75% solids. A film baked at 120° C. for 8 hours was hard, non-tacky, and could be marked with the finger nail. A film baked at 120° C. for 8 hours in the presence of 5% butyl hydroperoxide and at 100° C. for 6 hours was hard and tough and could not be marked with the finger nail.

*Example 5.*—Monophenyl triethoxy siliconate $C_6H_5Si(OC_2H_5)_3$ was heated at 170° to 180° C. for 8 hours while dry air was passed through. A dark colored, viscous liquid was secured. A film of the liquid gave a hard, somewhat brittle film on baking at 150° C. for 6 hours. A film containing 1% benzoyl peroxide gave a hard, tough film on baking at 150° C. for 1 hour.

*Example 6.*—Monocyclohexyl triethoxy siliconate $(CH_2)_5CHSi(OC_2H_5)_3$ was heated for 6 hours at 170° to 180° C. while dry air was passed through. A viscous liquid was secured. A film of the liquid gave a hard, tough film on baking at 150° C. for 2 hours. A film containing 2% benzoyl peroxide gave an exceedingly hard, tough film on baking at 120° C. for 2 hours.

*Example 7.*—Diethyl diethoxy siliconate $$(C_2H_5)_2Si(OC_2H_5)_2$$

was heated for 4 hours at 120° C. and for 6 hours at 150° C. while air was passed through. A viscous liquid was secured which was thinned with xylol to form a solution containing 75% solids. A film baked for 16 hours at 100° C. was clear and slightly tacky; it possessed a Sward Rocker hardness of 7. A film containing 2.5% benzoyl peroxide was baked at 100° C. for 16 hours. It was clear and completely tack-free; and possessed a Sward Rocker hardness of 19.

*Example 8.*—Diethyl diethoxy siliconate $$(C_2H_5)_2Si(OC_2H_5)_2$$

to which was added 2.5% benzoyl peroxide was heated for 4 hours at 120° C. and for 6 hours at 150° C. in a container through which dry air was passed. An extremely viscous syrup containing a small amount of insoluble gel particles was secured. A xylol solution was prepared containing 55% solids from which the insoluble particles were removed by centrifuging. A film of the xylol solution after baking for 2 hours at 100° C. was hard and brittle, it cracked and peeled from the glass.

*Example 9.*—Gaseous ethylene oxide was bubbled through 135 parts of well agitated trichlorosilane and cooled in an ice bath until the exothermic reaction had ceased and the reaction mixture had increased 140 parts by weight. The resulting product tris beta chloroethoxy silane boiled at 154° to 158° C. at 18 mm. The product was a clear colorless liquid with a faint odor. The tris beta chloroethoxy silane (chlorethyl silico formate)

$$ClH_2CH_2CO-\underset{\underset{OCH_2CH_2Cl}{|}}{\overset{\overset{H}{|}}{Si}}-OCH_2CH_2Cl$$

was heated for 4 hours at 170° to 180° C. and for 6 hours at 180° to 200° C. in a container through which dry air was passed to secure a relatively viscous syrup. A film baked at 150° C. for 5 hours was clear, dust-free; but tacky. A film containing 2% benzoyl peroxide was baked at 150° C. for 2 hours. A hard, brittle tack-free film was secured.

*Example 10.*—n-butyl triethoxy silane $$C_4H_9Si(OC_2H_5)_3$$

which boiled at 190° to 195° C. was heated in a container for 12 hours at 170° to 180° C. while air, dried by passage through calcium chloride and concentrated sulphuric acid, was slowly bubbled through. The resulting syrup was exceedingly viscous and was reduced with xylol to 75% solids.

A film of the xylol solution baked for 4 hours at 150° C. was clear and dust free; but tacky.

A film of the xylol solution baked for 4 hours at 150° C. and containing 2% benzoyl peroxide was clear, non-tacky, hard, and very tough.

A film of the xylol solution baked for 4 hours at 150° C. and containing 2% lauroyl peroxide was clear, non-tacky, and tough.

A film of the xylol solution baked for 4 hours at 150° C. and containing 2% of hydroxycyclohexyl hydroperoxide was clear, non-tacky and tough.

A film of the xylol solution baked for 4 hours at 150° C. and containing 2% acetyl peroxide in dimethyl phthalate was cloudy, non-tacky and tough.

A film of the xylol solution baked for 4 hours at 150° C. and containing 2% t-butyl hydroperoxide was clear, non-tacky and tough.

A film of the xylol solution baked for 2 hours at 150° C. and containing 10% sodium perborate was clear, very hard and brittle.

A film of the xylol solution baked for 2 hours at 150° C. and containing 10% zinc peroxide was cloudy, very hard and tough.

A film of the xylol solution baked for 2 hours at 150° C. and containing 10% ammonium perborate was clear, hard and brittle.

*Example 11.*—N-butyl triethoxy silane

which boiled at 190° to 195° C. was heated in a container for 6 hours at 150° to 160° C. while air, dried by passage through calcium chloride and concentrated sulphuric acid, and finally through an ozonizer was slowly bubbled through. The liquid whose viscosity was reduced with xylol, gave a hard, somewhat brittle film on baking a thin layer on glass at 150° C. for 5 hours.

*Example 12.*—N-butyl triethoxy silane

which boiled at 190° to 195° C. was heated in a container, with 0.10% vanadium pentoxide suspended therein, for 6 hours at 150° to 160° C. while air previously dried by passage through calcium chloride and concentrated sulphuric acid, was slowly bubbled through. The liquid became very viscous. The liquid whose viscosity was reduced with xylol gave a hard, brittle film on baking a thin layer on glass for 4 hours at 150° C.

*Example 13.*—A commercial hydrolyzed, partially polymerized silicone resin solution containing 59 per cent toluol, was flowed on a glass plate and baked for one hour at 120° C. The baked coating was wet and tacky.

The same commercial hydrolyzed, partially polymerized silicone resin solution containing 59 per cent toluol and 1% benzoyl peroxide based on the solids content of the resin, was flowed on a glass plate and baked for one hour at 120° C. The baked coating was dust free and slightly tacky.

The same commercial hydrolyzed, partially polymerized silicone resin solution containing 59 per cent toluol in which 1% benzoyl peroxide and 1% lead as lead naphthenate based on the solids content of the resin, was flowed on a glass plate and baked for one hour at 120° C. A hard, tough baked coating was secured.

The commercial silicone resin treated in this example is known as Dow-Corning resin solution No. 2052.

*Example 14.*—Hexamethoxy disiloxane was heated at 170–180° C. while air was passed through until the liquid attained a glycerine-like consistency. A 50% solution of this material was made in xylene.

A film was poured on glass and then baked in the oven at 125° C. It cured to a hard, dry, flexible film in about 6 hours.

To a portion of the solution benzoyl peroxide was added (2.5% based upon the silicone content) and film poured on glass from the resulting solution. This film cured hard, dry, and flexible in fifty minutes.

*Example 15.*—Tetrabutoxy silane was heated at 170–180° C. A stream of air was bubbled through until a glycerine-like consistency was obtained. A solution was made up with xylene containing 50% solute.

A film from this solution was poured on a glass plate which was then placed in the oven at 125° to bake. After 20 hours the film was soft and somewhat tacky.

To a portion of the above solution a quantity of benzoyl peroxide was added equal to 2.5% by weight based on solids content. A film was poured as before. This film cured to a hard, dry, flexible coating in 50 minutes at 125° C.

*Example 16.*—A sample of tetrakis (beta chloropropoxy) silane was maintained at a temperature of 160–170° C. while a moderately rapid stream of dry air was bubbled through for 8½ hours to yield a clear, highly viscous liquid. A 50% solids solution was made in xylene and divided into two portions, to one of which was added 1% benzoyl peroxide based on solids content. Films were poured on glass plates from both portions and heated at 120° C. The solution with added peroxide gave a hard, clear, colorless film in 45 minutes at this temperature, while the other film had not cured hard even after 6½ hours.

*Example 17.*—To another sample of tetrakis (beta chloropropoxy) silane was added 1% vanadium pentoxide to form a suspension, which was then aerated, as in Example 16, for 10 hours to a resinous material. A 50% solution in xylene gave films on glass which cured hard and flexible in 1 hour at 120° C. Addition of 1% benzoyl peroxide based on solids did not appreciably affect rate of cure.

The treatment of the derivative with vanadium pentoxide in the presence of oxygen may be carried out for a shorter period, as for example, only a few hours and the curing operation completed by the utilization of a peroxide such as by the addition of 1% peroxide and further curing.

Thus the time required for the production of polymeric derivatives by the action of peroxides on saturated esters of a silicon acid may be relatively short, as for example, from ½ hour to 1 or 2 hours. The time of such treatment may depend on the nature of the ester being treated, the temperature at which the treatment is carried out, and other factors. In some cases treatment up to 4 to 6 hours may be used but in no case will the time exceed 24 hours. Aeration prior to treatment with peroxide may be employed for times of from 4 to 6 hours to as high as 8, 10, 12 or even 20 hours, followed by heat treatment with peroxide for time periods as indicated above. The temperatures employed during such treatments are indicated in the examples but preferably will be above 100° C., and generally between 100 and 200° C. At such temperatures, treatment with peroxide with or without a preceding aeration, will not generally exceed about 36 hours and will usually be very much less. The action of the peroxide is much more rapid than aeration, and other differences arise also.

As stated above, the time of treatment may depend on the nature of the silicon compound being treated. Thus silicones require much shorter treatment than esters containing no siloxane groups particularly where polysiloxanes are treated the time may be of the shorter intervals indicated above.

This application is a continuation in part of application Serial No. 624,098, filed October 23, 1945, entitled Polymerization by Oxidation, now Patent Number 2,572,876.

Having thus set forth our invention, we claim:

1. The method of preparing polymeric organo silicon derivatives which comprises heating above 100° C. but below its boiling point a saturated ester of a mono-hydroxy compound with an inorganic silicon-oxy acid while blowing dry oxygen containing gas through the ester maintained in liquid condition, for a period of less than 24 hours, the heat treatment including blowing and peroxide treatments, the blowing increasing the viscosity of the material undergoing treatment, the peroxide being used in catalytic amount, the heat treatment producing a polymeric organo silicon derivative.

2. The method of claim 1 where the silicon-oxy acid is silicoformic acid.

3. The method of claim 1 where the silicon-oxy acid is orthosilicic acid.

4. The method of claim 1 where the silicon-oxy acid is a polysilicic acid.

5. The method of claim 1 where the ester is an alkyl ester.

6. The method of claim 1 where the ester is an aryl ester.

7. The method of claim 1 where the ester is a haloalkyl ester.

8. The method of claim 1 where the ester is a halo-alkyl ester of silicoformic acid.

9. The method of claim 1 where the ester is an alkyl ester of orthosilicic acid.

10. The method of claim 1 where the ester is an aryl ester of silicoformic acid.

11. The method of claim 1 where the ester is an alkyl ester of a polysilicic acid.

12. The method as set forth in claim 1 in which the ester is an alkyl ester of silicoformic acid.

13. The method as set forth in claim 1 in which the oxygen and peroxide treatments are successive.

14. The method as set forth in claim 13 where the silicon-oxy acid is a silicoformic acid.

15. The method as set forth in claim 13 where the silicon-oxy acid is orthosilicic acid.

16. The method as set forth in claim 13 in which the silicon-oxy acid is a polysilicic acid.

17. The method as set forth in claim 13 where the ester is an alkyl ester.

18. The method as set forth in claim 13 where the ester is an aryl ester.

19. The method as set forth in claim 13 where the ester is a halo-alkyl ester.

20. The method as set forth in claim 13 where the silicon-oxy acid is silicoformic acid and the ester is an alkyl ester.

21. The method as set forth in claim 13 where the silicon-oxy acid is orthosilicic acid and the ester is an alkyl ester.

22. The method as set forth in claim 13 where the silicon-oxy acid is a polysilicic acid and the ester is an alkyl ester.

23. The method as set forth in claim 13 where the ester is an aryl ester and the acid is silicoformic acid.

24. The method as set forth in claim 13 where the ester is a halo-alkyl ester and the acid is silicoformic acid.

25. The product resulting from the method of claim 1.

26. The product of claim 25 in which the silicon-oxy acid is silicoformic acid.

27. The product of claim 25 in which the silicon-oxy acid is orthosilicic acid.

28. The product of claim 25 in which the silicon-oxy acid is a polysilicic acid.

JOHN B. RUST.
CHARLES A. MacKENZIE.

REFERENCES CITED

The following references are of record in the file of this patent:

UNITED STATES PATENTS

| Number | Name | Date |
|---|---|---|
| 2,114,866 | Vaughn | Apr. 19, 1938 |
| 2,386,467 | Hyde | Oct. 9, 1945 |
| 2,347,727 | Dandt | Apr. 2, 1946 |
| 2,431,878 | McGregor | Dec. 2, 1947 |
| 2,437,204 | McGregor et al. | Mar. 2, 1948 |
| 2,448,565 | Wright | Sept. 7, 1948 |
| 2,507,422 | Rust et al. | May 9, 1950 |
| 2,572,876 | Rust et al. | Oct. 30, 1951 |

FOREIGN PATENTS

| Number | Country | Date |
|---|---|---|
| 707,393 | Germany | June 20, 1941 |